United States Patent
Shaarpour

(10) Patent No.: US 7,534,744 B2
(45) Date of Patent: May 19, 2009

(54) METHOD AND COMPOSITION FOR PREVENTING OR TREATING LOST CIRCULATION

(75) Inventor: Mano Shaarpour, Sugar Land, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/377,116

(22) Filed: Mar. 16, 2006

(65) Prior Publication Data
US 2006/0178275 A1 Aug. 10, 2006

Related U.S. Application Data

(62) Division of application No. 10/053,182, filed on Jan. 16, 2002, now Pat. No. 7,066,285.

(51) Int. Cl.
*C09K 8/34* (2006.01)
*C09K 8/12* (2006.01)
*E21B 7/00* (2006.01)

(52) U.S. Cl. .................. 507/120; 507/225; 507/903; 166/244.1

(58) Field of Classification Search ................ 507/120, 507/225, 903
See application file for complete search history.

(56) References Cited

U.S. PATENT DOCUMENTS

| 3,633,689 | A | | 1/1972 | Christman |
| 4,473,480 | A | | 9/1984 | Green et al. |
| 4,830,766 | A | * | 5/1989 | Gallup et al. ............... 507/203 |
| 5,401,719 | A | | 3/1995 | DeBeer |
| 5,458,195 | A | | 10/1995 | Totten et al. |
| 5,501,277 | A | | 3/1996 | Onan et al. |
| 5,569,324 | A | | 10/1996 | Totten et al. |
| 5,826,669 | A | | 10/1998 | Zaleski et al. |
| 6,152,227 | A | | 11/2000 | Lawson et al. |
| 6,825,152 | B2 | | 11/2004 | Green |
| 2004/0023815 | A1 | | 2/2004 | Burts, III |
| 2004/0224852 | A1 | | 11/2004 | Halliday et al. |

FOREIGN PATENT DOCUMENTS

WO WO 99/21933 5/1999
WO WO 01/74967 A1 10/2001

OTHER PUBLICATIONS

Steelseal(TM) Sales Brochure, Baroid, a Halliburton Company, May 1999.*
Diamond Seal(TM) Sales Brochure, Halliburton Energy Services, Inc., Aug. 2000.*

* cited by examiner

*Primary Examiner*—Timothy J Kugel
(74) *Attorney, Agent, or Firm*—Craig W. Roddy; Karen B. Tripp

(57) ABSTRACT

An improved composition and method is provided for preventing or alleviating lost circulation during the drilling of wellbores in subterranean formations, and particularly during the drilling of oil and gas wells. The method is suited for horizontal and directional wells as well as more vertical wells. The composition of the invention comprises a synergistic blend of resilient, angular, carbon-based material and a water-swellable, crystalline synthetic polymer. The method employs the composition of the invention in preventing lost circulation.

4 Claims, No Drawings

METHOD AND COMPOSITION FOR PREVENTING OR TREATING LOST CIRCULATION

RELATED APPLICATION

This application is a division of U.S. patent application Ser. No. 10/053,182, filed Jan. 16, 2002, now U.S. Pat. No. 7,066,285.

BACKGROUND OF THE INVENTION

1. Field of the Invention

The present invention pertains to methods and compositions for preventing or alleviating the loss of drilling fluids into a subterranean formation during drilling of boreholes in said formation.

2. Description of Relevant Art

In the oil and gas industry, a common problem in drilling wells or boreholes in subterranean formations is the loss of circulation (of fluids, such as drilling fluids or muds) in a well or borehole during the drilling. Such lost fluids typically go into fractures induced by excessive mud pressures, into pre-existing open fractures, or into large openings with structural strength in the formation.

A large variety of materials have been used or proposed in attempts to cure lost circulation. Generally, such materials may be divided into four types or categories: fibrous materials, such as shredded automobile tires or sawdust; flaky materials, such as wood chips and mica flakes; granular materials, such as ground nutshells; and slurries, whose strength increases with time after placement, such as hydraulic cement.

Another type of slurry that thickens downhole is made, typically, by dispersing a polyacrylamide in water and then emulsifying the dispersion in a paraffinic mineral oil, typically using a polyamine as an emulsifier. Bentonite is commonly added to such a slurry where it remains in the external or oil phase of the slurry. At normal shear rates, the bentonite rarely if at all contacts the water so the slurry remains relatively thin while being pumped down the drill pipe. At higher shear rates such as prevailing at the drill bit, the emulsion breaks and the bentonite mixes with the water. Crosslinking by the polyacrylamide results in a semi-solid mass that thickens further with the bentonite as it is pumped into cracks and fractures in the formation to block the lost circulation.

Although many materials and compositions exist and have been proposed for preventing lost circulation, there continues to be a need for more versatile and better compositions and methods for preventing loss of circulation.

SUMMARY OF THE INVENTION

The present invention provides an improved composition for preventing or alleviating loss of drilling fluids or circulation in a wellbore penetrating a subterranean formation. The composition is comprised of a blend of a resilient, angular, carbon-based material and a water-swellable, but not water-soluble, crystalline synthetic polymer. Preferred carbon-based materials comprise resilient graphite carbon particles and ungraphitized carbon particles. Preferred synthetic polymers comprise polyacrylamide. The most preferred polymers comprise a dehydrated crystallized form of cross-linked polyacrylamide that will readily hydrate following exposure to water or aqueous based fluids. Such hydration may be delayed by salts in the water, such as the use of brine or addition of calcium chloride for example.

The method of the invention uses the composition of the invention in preventing or alleviating loss of drilling fluid or other fluid circulation in a wellbore penetrating a subterranean formation. In the method, the composition is preferably provided in a weighted or unweighted "pill" for introduction into the wellbore. Such "pills" typically comprise such composition blended with a small amount of drilling fluid or brine. The amount of such composition used in such pill will depend on the size of the subterranean fracture, opening, or lost circulation zone to be treated. Multiple pills or treatments may be used if needed. Preferably drilling is stopped while the pill comprising the composition of the invention is introduced into and circulated in the wellbore. The composition of the invention will enter lost circulation zones or porous or fractured portions of the formation where it will prevent or retard the entry of drilling and other wellbore fluids.

DETAILED DESCRIPTION OF PREFERRED EMBODIMENTS

According to the prevent invention, an unexpected synergy and improved lost circulation material may be obtained by combining two materials or compositions that have previously been known to be effective in preventing or alleviating lost circulation, but that are not individually as effective as the combination. The two components effecting such synergy are resilient, angular carbon-based material and water swellable but not water-soluble crystalline polymer.

The preferred carbon-based material preferably has a particle size that is about 95% greater than 200 mesh and about 100% less than 40 mesh. The preferred carbon-based material is preferably a dual-composition of resilient graphitic carbon particles and ungraphitized carbon particles, where preferably the quantity of resilient graphitic carbon particles exceeds the quantity of ungraphitized carbon particles or in any case where the overall composition is resilient. Carbon particles or carbon-based materials are considered resilient for purposes of the present invention if they rebound by at least about 20 volume percent when a compaction pressure of 10,000 psi is applied. A most preferred carbon-based material that is commercially available is STEELSEAL™, available from Halliburton Energy Services, Inc. in Houston, Tex., U.S.A.

The preferred synthetic polymers comprise polyacrylamide. The most preferred polymers comprise a dehydrated crystallized form of cross-linked polyacrylamide that will readily hydrate following exposure to water or aqueous based fluids. Such hydration may be delayed by salts in the water, such as with the use of brine or addition of calcium chloride for example. A most preferred crystalline polymer that is commercially available is DIAMOND SEAL™, also available from Halliburton Energy Services, Inc. in Houston, Tex., U.S.A.

STEELSEAL™ has tightly packed particles that can expand and contract under compression in pores and fractures of a subterranean formation without being dislodged or collapsing due to changes in differential pressures. STEELSEAL™ is known to be useful as a lost circulation additive for synthetic and oil-based drilling fluids to stop circulation losses in porous and fractured formations. STEELSEAL™ is also known to be effective in water-based or aqueous based fluids as a lost circulation additive and as a solid lubricant for torque and drag reduction.

DIAMOND SEAL™ is 100% crystalline synthetic polymer having the ability to absorb hundreds of times its own weight in water. For example, in fresh water, DIAMOND SEAL™ can swell 3.5 cubic feet per pound. DIAMOND SEAL™ particles are sized such that about 96% pass through 5 mesh (4.0 ml). DIAMOND SEAL™ is known to be effective at mitigating lost circulation, particularly in horizontal or directional drilling, and it can stabilize boreholes in unconsolidated formations.

The composition of the present invention comprises combinations of STEELSEAL™ and DIAMOND SEAL™ that are more effective at alleviating or preventing lost circulation than either of these components are individually, as demonstrated by the test data below. Further, the composition of the invention is effective without addition of reinforcing materials or other fibers. Moreover, the composition of the invention can provide effective bridges across even large, problematic fractures.

Various concentrations of STEELSEAL™ and DIAMOND SEAL™ were tested as shown in Table I. These two components were blended together and then added to a 14 pounds per barrel (ppb) freshwater mud and mixed for five minutes in a multimixer. The mud was then tested in a HPHT at 200 degrees Fahrenheit with a one hour heat lamp and 500 psi differential pressure using a 190 micron disc. The relative filtrate was then collected and measured.

TABLE I

| Treatment | Spurt 1 min., mls. | Total Relative Filtrate (30 × 2), mls. |
| --- | --- | --- |
| 80 ppb STEELSEAL ™<br>0 ppm DIAMOND SEAL ™ | 6 | 50 |
| 70 ppb STEELSEAL ™<br>10 ppb DIAMOND SEAL ™<br>(treated with 2000 ppm glyoxal)<br>in a dispersed mud | 5 | 12 |
| 70 ppb STEELSEAL ™<br>10 ppb DIAMOND SEAL ™<br>(treated with 2000 ppm glyoxal) | 5 | 10 |
| 78 ppb STEELSEAL ™<br>2 ppb DIAMOND SEAL ™<br>(treated with 5000 ppm glyoxal) | 5 | 39 |
| 78 ppb STEELSEAL ™ FINE<br>2 ppb DIAMOND SEAL ™ | 6 | 25 |
| 0 ppb STEELSEAL ™<br>10 ppb DIAMOND SEAL ™ | 12 | 59 |

As used herein, ppb = pounds per barrel and ppm = parts per million.

As the data in Table I shows, enhanced reduction in filtrate (indicating good performance as a lost circulation material) is seen with the combination over and above the performance of either material alone. The performance reflects a surprising synergy in the combination that is not suggested by or apparent from just combining the performance of either material used alone.

Also as shown in the experimental data above, other materials or components may be added to the combination of the components of the invention. For example, glyoxal may be added to facilitate the combination of the components. Moreover, the data shows the composition of the invention is effective at high temperatures, particularly temperatures typically encountered at intermediate wellbore depths of less than about 15,000 feet. Such intermediate depths are where most lost circulation typically occurs, if at all, during drilling for the recovery of hydrocarbons.

In the composition of the invention, the most preferred quantity of STEELSEAL™ to DIAMOND SEAL™ is about 90:10 although ranges of STEELSEAL™ of about 70 pounds per barrel (ppb) to about 90 ppb and of DIAMOND SEAL™ of about 2 ppb to about 10 ppb are also preferred. The composition of the invention may be used in, added to, or blended in any water or aqueous based drilling fluid or mud, including for example brines and aqueous fluids comprising salts as well as fresh water.

According to the method of the invention, the composition of the invention is used as a lost circulation material. That is, a pill or plug comprising the composition of the invention is introduced into the wellbore and allowed to circulate through the wellbore at least to the zone needing lost circulation treatment or to the zone where lost circulation is believed to likely occur. The composition of the invention is then allowed to enter such zone. Such zone may be or may comprise or include, without limitation, fractures and porous formations. In such zone, the composition of the invention reduces, eliminates or prevents the entry of drilling fluid and/or other well fluids into said zone.

The foregoing description of the invention is intended to be a description of preferred embodiments. Various changes in the details of the described composition and method can be made without departing from the intended scope of this invention as defined by the appended claims.

What is claimed is:

1. A drilling fluid comprising a lost circulation additive comprising:
    about 70 ppb to about 90 ppb resilient carbon-based material and about 2 ppb to about 10 ppb water swellable but not water-soluble crystalline synthetic polymer,
        wherein the resilient carbon-based material comprises resilient graphitic carbon particles and ungraphitized carbon particles and the quantity of the resilient graphitic carbon particles exceeds the quantity of ungraphitized carbon particles,
        wherein the resilient carbon-based material has a particle size about 95% larger than 200 mesh and about 100% smaller than 40 mesh,
        wherein the synthetic polymer comprises a dehydrated crystallized form of cross-linked polyacrylamide that will readily hydrate following exposure to water, and
        wherein the combination of the resilient carbon-based material and the synthetic polymer is facilitated in the additive with a facilitating amount of glyoxal, such that the blend prevents or alleviates lost circulation to a synergistically greater amount than either the resilient carbon-based material or the synthetic polymer would provide one without the other.

2. The drilling fluid of claim 1 wherein the lost circulation additive does not comprise reinforcing materials.

3. The drilling fluid of claim 1 wherein the drilling fluid does not comprise reinforcing materials.

4. The drilling fluid of claim 1 wherein the ppb ratio of said resilient carbon-based material to said water swellable but not water-soluble crystalline synthetic polymer is 90:10.

* * * * *